(12) United States Patent
Nishio

(10) Patent No.: US 11,753,767 B2
(45) Date of Patent: Sep. 12, 2023

(54) METHOD OF AND DEVICE FOR MANUFACTURING RUBBER COATED TWISTED WIRE CORD

(71) Applicant: The Yokohama Rubber Co., LTD., Tokyo (JP)

(72) Inventor: Satoru Nishio, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 169 days.

(21) Appl. No.: 16/641,132

(22) PCT Filed: Jun. 7, 2018

(86) PCT No.: PCT/JP2018/021895
§ 371 (c)(1),
(2) Date: Feb. 21, 2020

(87) PCT Pub. No.: WO2019/039040
PCT Pub. Date: Feb. 28, 2019

(65) Prior Publication Data
US 2020/0173101 A1 Jun. 4, 2020

(30) Foreign Application Priority Data

Aug. 21, 2017 (JP) .................................. 2017-158637

(51) Int. Cl.
*D07B 7/14* (2006.01)
*B29C 48/18* (2019.01)
(Continued)

(52) U.S. Cl.
CPC .............. *D07B 7/145* (2013.01); *B29C 48/18* (2019.02); *B29C 48/34* (2019.02); *D07B 1/06* (2013.01);
(Continued)

(58) Field of Classification Search
CPC ........ H01B 13/14; H01B 13/145; H01B 7/02; B29C 48/154; B29C 48/156; B29C 48/18;
(Continued)

(56) References Cited

U.S. PATENT DOCUMENTS 1,500,546 A * 7/1924 Burley .................. H01B 13/14
264/103
2,119,570 A * 6/1938 Brillhart ............... B29C 48/154
118/67

(Continued)

FOREIGN PATENT DOCUMENTS

EP    0257459 A2   3/1988
GB     919078 A    2/1963
(Continued)

OTHER PUBLICATIONS

Machine translation of JP 2003-340926, Dec. 2, 2003. (Year: 2003).*

(Continued)

*Primary Examiner* — Xiao S Zhao
*Assistant Examiner* — Joseph S Leyson
(74) *Attorney, Agent, or Firm* — THORPE NORTH & WESTERN

(57) ABSTRACT

In a method of manufacturing a rubber coated twisted wire cord, when an outer circumferential surface of a twisted wire cord that is moving from an unreeling unit to a winding unit is coated with unvulcanized rubber extruded by a rubber extruder, by a coating unit disposed between the unreeling unit and a winding unit, in a state of additional tension being imparted on the moving twisted wire cord by a tension imparting unit disposed at a nearby position on an upstream side from the coating unit in a moving direction of the twisted wire cord, the unvulcanized rubber coats the outer circumferential surface of the twisted wire cord in this state to continuously manufacture a rubber coated twisted wire cord.

6 Claims, 10 Drawing Sheets

(51) Int. Cl.
  *B29C 48/34* (2019.01)
  *H01B 13/14* (2006.01)
  *D07B 1/06* (2006.01)
  *D07B 1/16* (2006.01)
  *H01B 7/02* (2006.01)

(52) U.S. Cl.
  CPC ............... *D07B 1/16* (2013.01); *H01B 7/02* (2013.01); *H01B 13/14* (2013.01); *D07B 2205/2075* (2013.01); *D07B 2205/3021* (2013.01)

(58) Field of Classification Search
  CPC .......... B29C 48/34; B29C 48/35; D07B 1/06; D07B 1/062; D07B 1/16; D07B 7/145; D07B 2201/2044; D07B 2205/2075; D07B 2205/3021; D07B 2301/258
  See application file for complete search history.

(56) References Cited

U.S. PATENT DOCUMENTS

| | | | | |
|---|---|---|---|---|
| 2,360,097 | A | * | 10/1944 | Balthis ................ B29C 48/919 118/325 |
| 4,057,956 | A | * | 11/1977 | Tolle ...................... D07B 1/162 57/80 |
| 2007/0243761 | A1 | * | 10/2007 | Chambers ............... B29C 48/95 439/587 |
| 2015/0283750 | A1 | * | 10/2015 | Kenny ..................... B29C 48/90 264/171.24 |

FOREIGN PATENT DOCUMENTS

| | | |
|---|---|---|
| JP | S61-099217 | 5/1986 |
| JP | H02-123024 | 10/1990 |
| JP | H03-011489 | 2/1991 |
| JP | H06-210761 | 8/1994 |
| JP | 2003-340926 | 12/2003 |
| JP | 2009-340926 * | 12/2003 |
| JP | 2005-139585 | 6/2005 |
| JP | 2014-176991 | 9/2014 |

OTHER PUBLICATIONS

International Search Report for International Application No. PCT/JP2018/021895 dated Jul. 31, 2018, 4 pages, Japan.

* cited by examiner

METHOD OF AND DEVICE FOR MANUFACTURING RUBBER COATED TWISTED WIRE CORD

TECHNICAL FIELD

The present technology relates to a method of and a device for manufacturing a rubber coated twisted wire cord and particularly relates to a method of and a device for manufacturing a rubber coated twisted wire cord that can stably coat an outer circumferential surface of a twisted wire cord with unvulcanized rubber while preventing unraveling of the twisted wire cord.

BACKGROUND ART

During the manufacturing process of a rubber product such as a tire, a twisted wire cord whose outer circumferential surface is coated with unvulcanized rubber is used. Although there are several known methods for coating a twisted wire cord with unvulcanized rubber, twisting of the twisted wire cord may unravel due to effects such as the pressure when unvulcanized rubber is coated.

As illustrated in FIG. 10A, when unvulcanized rubber coats a twisted wire cord that has unraveled, a defect occurs in which a portion (wire strand 12a) of a twisted wire cord 12 is exposed from unvulcanized rubber 13 that coated the twisted wire cord 12. Alternatively, as illustrated in FIG. 10B, a defect occurs when the twisted wire cord 12 is coated with the unvulcanized rubber 13 in a state of eccentric deformation. If a rubber product is produced using a rubber coated twisted wire cord 11a which has such a defect, the quality may be affected.

A method of preventing unraveling of a twisted wire cord has been proposed in which resin, not unvulcanized rubber, coats the outer circumferential surface (see Japan Examined Patent Publication No. H03-011489). In Japan Examined Patent Publication No. H03-011489, after the resin that is coating a twisted wire cord is slightly cured, the resin is cured with grasping and passing the twisted wire cord through a clamp that is rotated and biased in the direction of twisting.

In this proposed method, a twisted wire cord is twisted again after coated with the resin, but even if the twisted wire cord, which has unraveled, is twisted again after coated with unvulcanized rubber, it is not possible to sufficiently prevent defects such as those illustrated in FIGS. 10A-10B. Furthermore, unvulcanized rubber cannot be cured in a short time like molten resins, and if the unvulcanized rubber is excessively cured, the adhesive force (adhesive strength) will be reduced, rendering the rubber coated twisted wire cord useless in the later steps. Thus, the proposed method cannot be applied to cases where unvulcanized rubber coats the outer circumferential surface of a twisted wire cord.

SUMMARY

The present technology provides a method of and a device for manufacturing a rubber coated twisted wire cord that can stably coat an outer circumferential surface of a twisted wire cord with unvulcanized rubber while preventing unraveling of the twisted wire cord.

The method of manufacturing a rubber coated twisted wire cord according to the present technology is a method of continuously manufacturing a rubber coated twisted wire cord by winding a twisted wire cord reeled out from an unreeling unit around a winding unit and by coating unvulcanized rubber on an outer circumferential surface of the twisted wire cord that is moving, wherein additional tension is imparted to the twisted wire cord at a nearby position on an upstream side from a position where the unvulcanized rubber coats the twisted wire cord in a moving direction of the twisted wire cord, and the unvulcanized rubber coats the outer circumferential surface of the twisted wire cord while the additional tension is imparted.

The device for manufacturing a rubber coated twisted wire cord according to the present technology includes: an unreeling unit and a winding unit for a twisted wire cord; a rubber extruder; and a coating unit that is disposed between the unreeling unit and the winding unit and that coats the twisted wire cord with unvulcanized rubber extruded by the rubber extruder, the device for manufacturing a rubber coated twisted wire cord, further comprising a configuration that the rubber coated twisted wire cord is manufactured continuously by coating an outer circumferential surface of the twisted wire cord with the unvulcanized rubber, the outer circumferential surface of the twisted wire cord moving from the unreeling unit to the winding unit, wherein the device for manufacturing a rubber coated twisted wire cord comprises a tension imparting unit that is disposed at a nearby position on an upstream side from the coating unit in a moving direction of the twisted wire cord and that imparts additional tension to the moving twisted wire cord, and the unvulcanized rubber coats the outer circumferential surface of the twisted wire cord while the additional tension is imparted.

According to an embodiment of the present technology, by imparting additional tension to a twisted wire cord immediately before unvulcanized rubber coats the outer circumferential surface of the twisted wire cord, the wire strands that constitute the twisted wire cord are tightly bundled together, and the twisted wire cord is tightly twisted. Thus, even if extrusion pressure of unvulcanized rubber that is coating the twisted wire cord acts, unraveling of the twisted wire cord will be difficult to occur, and it is possible to stably coat the outer circumferential surface with unvulcanized rubber.

DETAILED DESCRIPTION

Figure 1:
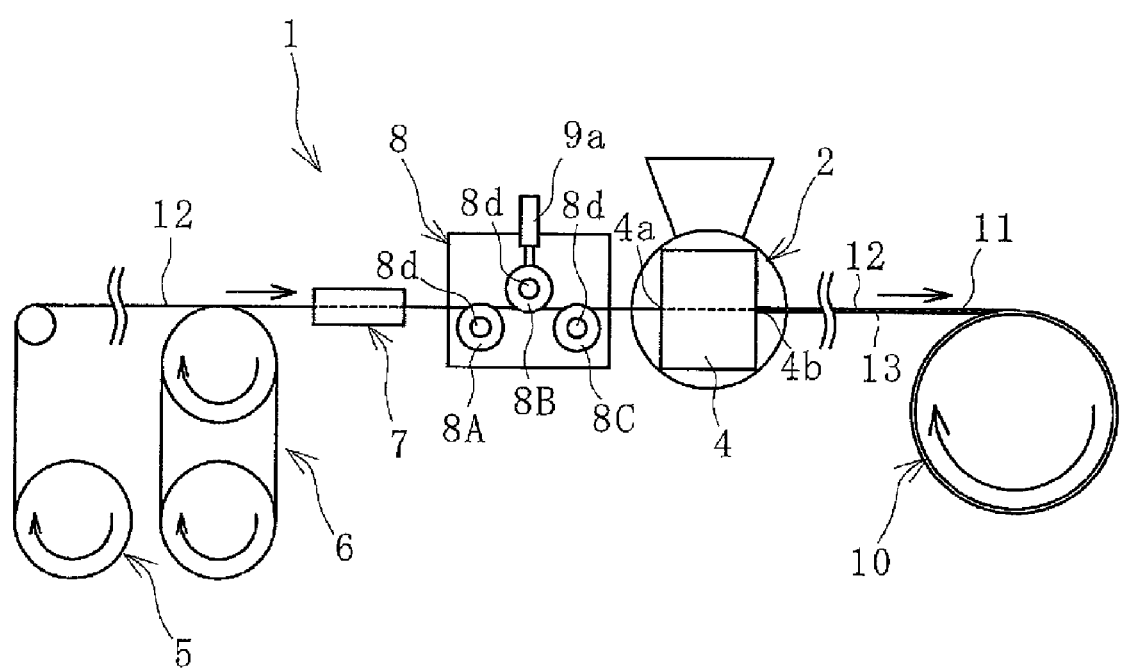
FIG. 1 is an explanatory diagram illustrating a device for manufacturing a rubber coated twisted wire cord according to an embodiment of the present technology in a front view.

Hereinafter, the method of and device for manufacturing rubber coated twisted wire cord of the present technology will be specifically described based on the embodiments shown in the drawings.

A device for manufacturing a rubber coated twisted wire cord 1 (hereinafter referred to as manufacturing device 1) of an embodiment of the present technology illustrated in FIG. 1 and FIG. 2 continuously produces a rubber coated twisted wire cord 11 coated with unvulcanized rubber 13 on the outer circumferential surface of the twisted wire cord 12. As illustrated in FIG. 3, the twisted wire cord 12 is formed by intertwining a plurality of metal wire strand 12a. As illustrated in FIG. 3, in a normal twisted wire cord 12 where the twisting is tight, the plurality of wire strand 12a is tightly bundled with each other.

The manufacturing device 1 includes an unreeling unit 5 and a winding unit 10 for the twisted wire cord 12; a rubber extruder 2; a coating unit 4 disposed between the unreeling unit 5 and the winding unit 10; and a tension imparting unit 8 disposed at a nearby position of the coating unit 4. The twisted wire cord 12 is continuous from the unreeling unit 5 to the winding unit 10. In this embodiment, the manufacturing device 1 further includes a wire storage unit 6 that stores a certain length of the twisted wire cord 12; and a heating unit 7 that heats the twisted wire cord 12.

The unreeling unit 5 that reels out the stocked twisted wire cord 12 includes, for example, a reel on which the twisted wire cord 12 is wound. The unreeling unit 5 has a brake capable of adjusting the tension acting on the twisted wire cord 12 to be reeled out.

The winding unit 10, which winds the rubber coated twisted wire cord 11, namely, the twisted wire cord 12 whose outer circumferential surface is coated with the unvulcanized rubber 13, includes, for example, a reel on which the twisted wire cord 12 is wound. The winding unit 10, rotationally driven by a drive motor or the like, moves the twisted wire cord 12 reeled out from the unreeling unit 5 and winds the rubber coated twisted wire cord 11.

The rubber extruder 2 extrudes the unvulcanized rubber 13 from an extruding head 3 at the end portion. The temperature of the unvulcanized rubber 13 is, for example, approximately from 70° C. or higher to 90° C. or lower. The box-shaped coating unit 4 is connected to the extruding head 3. The extruded unvulcanized rubber 13 fills the coating unit 4, is temporarily stored in the coating unit 4, and is then discharged to the outside of the coating unit 4. An inlet 4a and an outlet 4b via which the twisted wire cord 12 is inserted through are formed on opposing side surfaces of the coating unit 4. In this embodiment, the direction in which the unvulcanized rubber 13 is extruded and the moving direction of the twisted wire cord 12 are orthogonal, but the angle formed by the directions of the two is not limited to 90° and can be set to an appropriate angle.

The tension imparting unit 8 that imparts additional tension to the twisted wire cord 12 is disposed at a nearby position on the upstream side from the coating unit 4 in the moving direction of the twisted wire cord 12. For example, the tension imparting unit 8 is disposed at where the extension length of the twisted wire cord 12 from the tension imparting unit 8 to the coating unit 4 is within 1 m. Details of the tension imparting unit 8 will be described later.

The wire storage unit 6 and the heating unit 7 are disposed between the unreeling unit 5 and the tension imparting unit 8. The wire storage unit 6 is disposed more upstream than the heating unit 7 in the moving direction of the twisted wire cord 12. The wire storage unit 6 includes a pair of rotary rollers, and the twisted wire cord 12 is wound around the rotary rollers in a direction that is aside the width direction of the rollers.

The heating unit 7 includes a heater that can be heated to a predetermined temperature. By heating and passing the twisted wire cord 12 through the heating unit 7, the temperature of the twisted wire cord 12 is brought close to the temperature of the unvulcanized rubber 13 extruded by the rubber extruder 2. This heating facilitates the adhesion of the unvulcanized rubber 13 to the twisted wire cord 12. The heating unit 7 can also be disposed between the tension imparting unit 8 and the coating unit 4.

The tension imparting unit 8 of this embodiment includes three grooved rotary rollers 8A, 8B, 8C having circumferential grooves on the outer circumferential surfaces; and a movement mechanism 9a that moves one grooved rotary roller 8B. A fluid cylinder and the like can be used as the movement mechanism 9a. The amount of movement of the grooved rotary roller 8B by the movement mechanism 9a is controlled to a desired amount.

The three grooved rotary rollers 8A, 8B, and 8C are disposed with an interval in the moving direction of the twisted wire cord 12, with a rotation shaft 8d of each rotary roller crossing and being orthogonal to the moving direction of the twisted wire cord 12. The grooved rotary roller 8B located in the middle of the other two grooved rotary rollers 8A and 8C is positioned above the other two grooved rotary rollers. The two grooved rotary rollers 8A and 8C remain fixed in the position and not moved, while the single grooved roller 8B is moved up and down by the movement mechanism 9a. The twisted wire cord 12 is guided by engaging along the respective circumferential grooves of the grooved rotary rollers 8A, 8B, and 8C, at the upper portions of the two grooved rotary rollers 8A and 8B and at the lower portion of the single grooved rotary roller 8B. The twisted wire cord 12 abuts the respective outer circumferential surfaces of the grooved rotary rollers 8A, 8B, and 8C.

Next, the procedure of the method of manufacturing rubber coated twisted wire cord of an embodiment of the present technology will be described.

Figure 2:
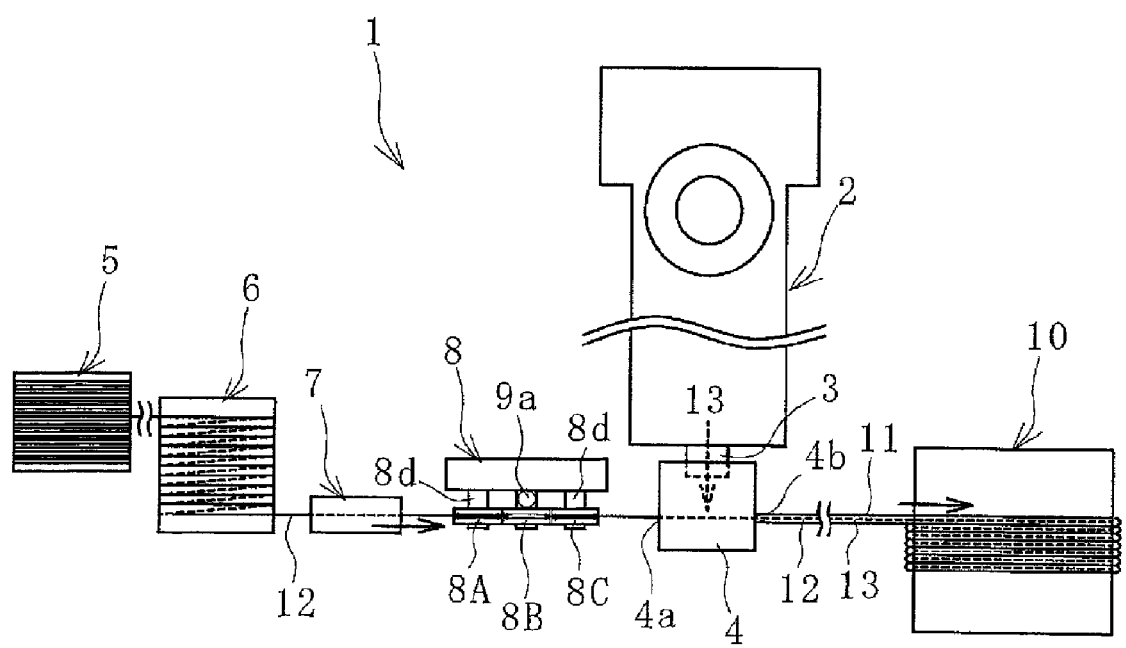
FIG. 2 is an explanatory diagram illustrating the manufacturing device of FIG. 1 in a plan view.
Figure 3:
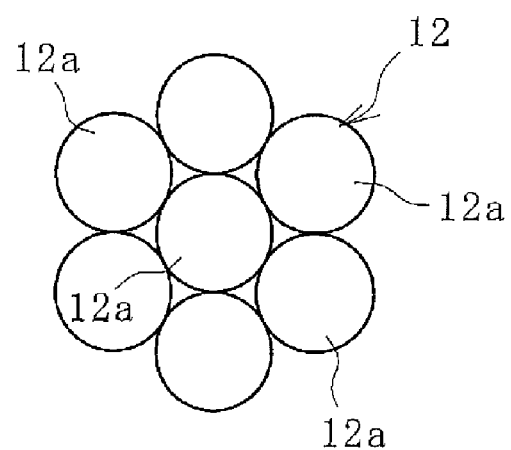
FIG. 3 is an explanatory diagram illustrating a normal twisted wire cord in a cross-sectional view.

As illustrated in FIG. 1 and FIG. 2, the twisted wire cord 12, by driving the winding unit 10, is drawn and moved from the unreeling unit 5 to the winding unit 10. In this moving process, the twisted wire cord 12 sequentially passes through the wire storage unit 6, the heating unit 7, the tension imparting unit 8, and the coating unit 4. A predetermined tension acts on the moving twisted wire cord 12 by the brake of the unreeling unit 5.

Figure 4:
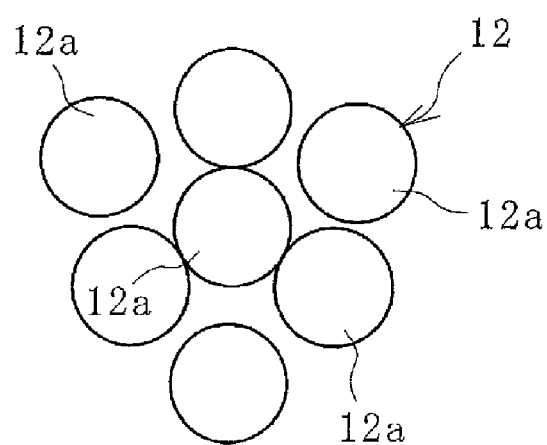
FIG. 4 is an explanatory diagram illustrating a twisted wire cord in a cross-sectional view, between the heating unit and the tension imparting unit of FIG. 1.
Figure 10A:
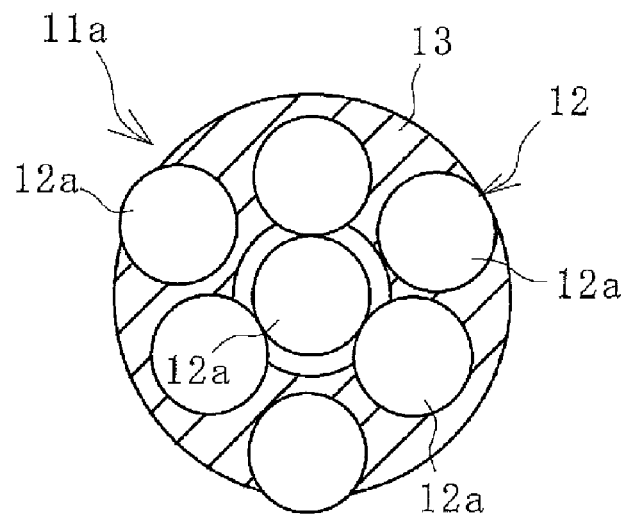
FIGS. 10A and 10B are an explanatory diagram illustrating a defective product of the rubber coated twisted wire cord in a cross-sectional view.
Figure 10B:
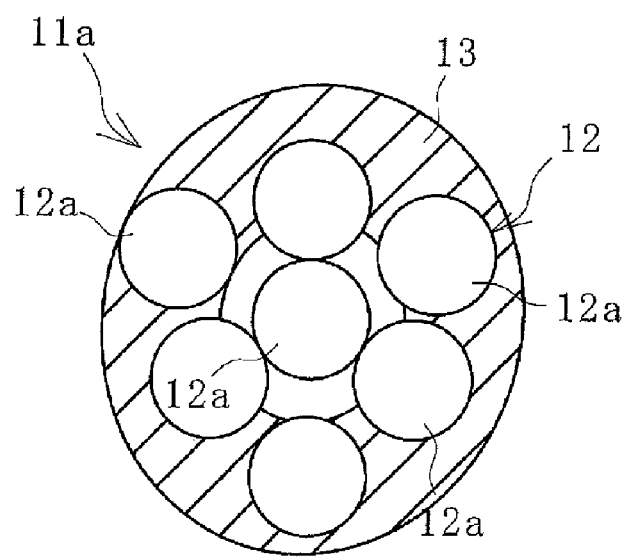

As illustrated in FIG. 4, between the heating unit 7 and the tension imparting unit 8, the bundling of the plurality of wire strand 12a in the twisted wire cord 12 may become loose. When the unvulcanized rubber 13 coats the twisted wire cord 12 in such a state, due to the extrusion pressure of the unvulcanized rubber 13, the bundling of the plurality of wire strand 12a is further loosened, and unraveling of the twisted wire cord 12 occurs. As a result, as illustrated in FIG. 10, a defective product of the rubber coated twisted wire cord 11a is manufactured.

Figure 5:
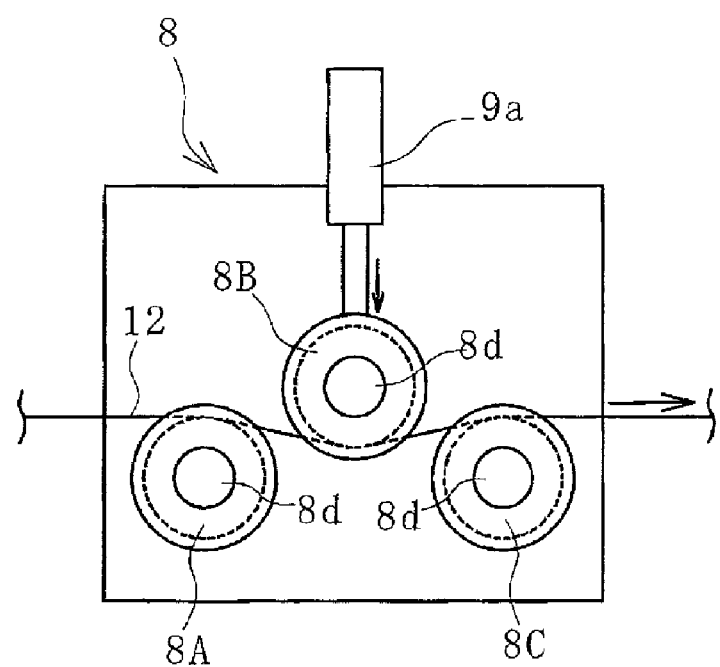
FIG. 5 is an explanatory view illustrating a state in which additional tension is imparted to the twisted wire cord by the tension imparting unit of FIG. 1 in a front view.

Thus, in an embodiment of the present technology, additional tension is imparted to the moving twisted wire cord 12 by the tension imparting unit 8, and the unvulcanized rubber 13 coats the outer circumferential surface of the twisted wire cord 12 when additional tension is imparted. As illustrated in FIG. 5, in this embodiment, additional tension is imparted to the twisted wire cord 12 by moving the grooved rotary roller 8B in the direction of the side of the outer circumferential surface abutting the twisted wire cord 12 (downward).

Figure 6:
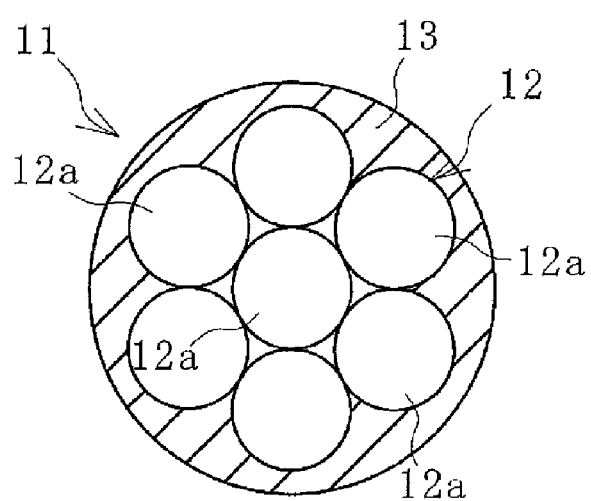
FIG. 6 is an explanatory diagram illustrating a manufactured rubber coated twisted wire cord in a cross-sectional view.

As illustrated in FIG. 3, by applying additional tension, the plurality of wire strand 12a can tightly bundle into each other, and the twisted wire cord 12 can be tightly twisted (enhanced twist). In an embodiment of the present technology, the unvulcanized rubber 13 coats the outer circumferential surface of the twisted wire cord 12 in such a state; thus, even if the extrusion pressure of the unvulcanized rubber 13 that acts on the twisted wire cord 12 is high to a certain degree, unraveling of the twisted wire cord 12 is unlikely to occur. Thus, the unvulcanized rubber 13 can stably coat the outer circumferential surface of the twisted wire cord 12. As a result, the entire outer circumferential surface of the twisted wire cord 12 is coated with the unvulcanized rubber 13, making it possible to continuously manufacture the good rubber coated twisted wire cord 11 illustrated in FIG. 6 in which eccentric deformation of the twisted wire cord 12 are prevented.

By setting the extension length of the twisted wire cord 12 from the tension imparting unit 8 to the coating unit 4 to be within 1 m, additional tension imparted to the twisted wire cord 12 by the tension imparting unit 8 is easily maintained to the coating unit 4. More preferably, the extension length of the twisted wire cord 12 from the tension imparting unit 8 to the coating unit 4 is set to be within 0.5 m.

The additional tension is set appropriately within a range of strength that does not cause unraveling in the twisted wire cord 12. For example, as the additional tension to be imparted on the twisted wire cord 12 by the tension imparting unit 8, an additional tension, which is from 20% or more to 120% or less; or from 30% or more to 100% or less of the tension that has been acting on the twisted wire cord 12 before, is imparted.

The number of the grooved rotary rollers 8A, 8B, and 8C is not limited to three and may be two, four, or the like. The number of the grooved rotary rollers 8A, 8B, and 8C to be moved when imparting tension to the twisted wire cord 12 is not limited to one and may be plural.

In this embodiment, each of the grooved rotary rollers 8A, 8B, and 8C is disposed with its respective rotation shaft 8d crossing the twisted wire cord 12, but no such limitation is intended for the direction of the rotation shaft 8d. For example, the grooved rotary rollers 8A, 8B, and 8C may be disposed with their respective rotation shafts 8d being longitudinal to the twisted wire cord 12.

Also, all or at least one of the grooved rotary rollers 8A, 8B, and 8C may be replaced with a simple rotary roller that does not have a circumferential groove on the outer circumferential surface. Alternatively, at least one of the grooved rotary rollers 8A, 8B, and 8C may be replaced with a non-rotating support member.

Figure 7:
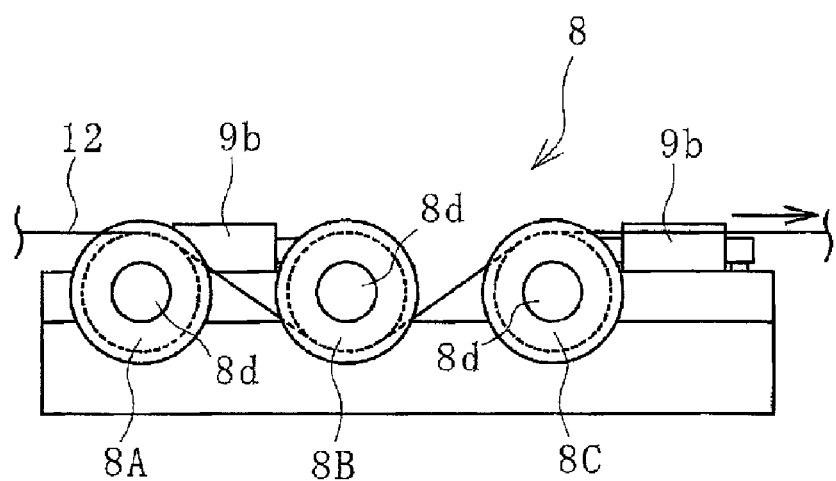
FIG. 7 is an explanatory diagram illustrating a modified example of the tension imparting unit of FIG. 1 in a front view.
Figure 8:
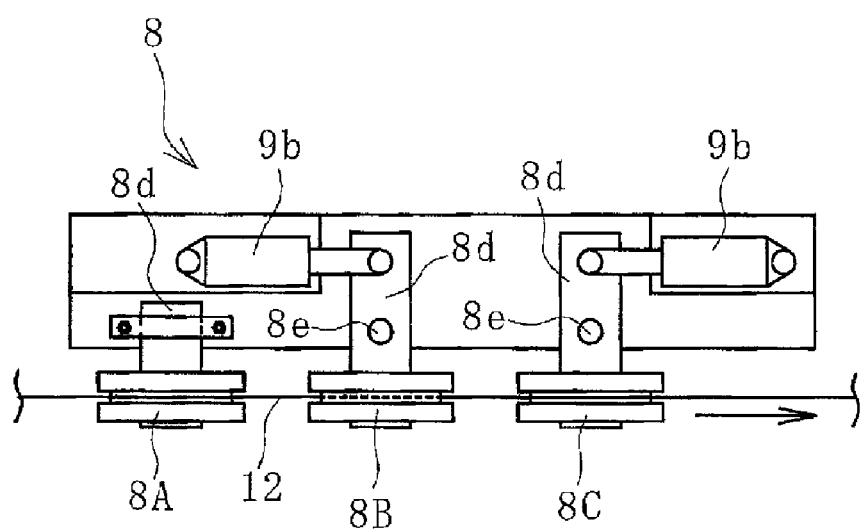
FIG. 8 is an explanatory diagram illustrating the tension imparting unit of FIG. 7 in a plan view.

The tension imparting unit 8 can also have the configuration illustrated in FIG. 7 and FIG. 8. The tension imparting unit 8 includes the three grooved rotary rollers 8A, 8B, and 8C, and a direction changing mechanism 9b that changes the orientation of the two grooved rotary rollers 8B and 8C. The two grooved rotary rollers 8B and 8C are connected to a frame with the rotation shaft 8d, the rotation of which being made possible by a pin 8e. A fluid cylinder or the like can be used as the direction changing mechanism 9b. By inserting and removing a rod of the fluid cylinder constituting the direction changing mechanism 9b, the grooved rotary rollers 8B and 8C rotate around the pin 8e. Accordingly, the orientations of the grooved rotary rollers 8B and 8C are changed. The orientations of the grooved rotary rollers 8B and 8C that are changeable by the direction changing mechanism 9b are controlled to a desired direction.

The three grooved rotary rollers 8A, 8B, and 8C are disposed with an interval in the moving direction of the twisted wire cord 12, with the rotation shaft 8d of each rotary roller crossing and being orthogonal to the moving direction of the twisted wire cord 12. The respective grooved rotary rollers 8A, 8B, and 8C are disposed at the same height position, but the height positions can be varied. The twisted wire cord 12 is guided by engaging along the respective circumferential grooves of the grooved rotary rollers 8A, 8B, and 8C, at the upper portions of the two grooved rotary rollers 8A and 8B and at the lower portion of the single grooved rotary roller 8B. The twisted wire cord 12, which is wound in a meandering manner through the respective grooved rotary rollers 8A, 8B, and 8C, abuts the outer circumferential surfaces of the respective grooved rotary rollers 8A, 8B, and 8C.

Figure 9:
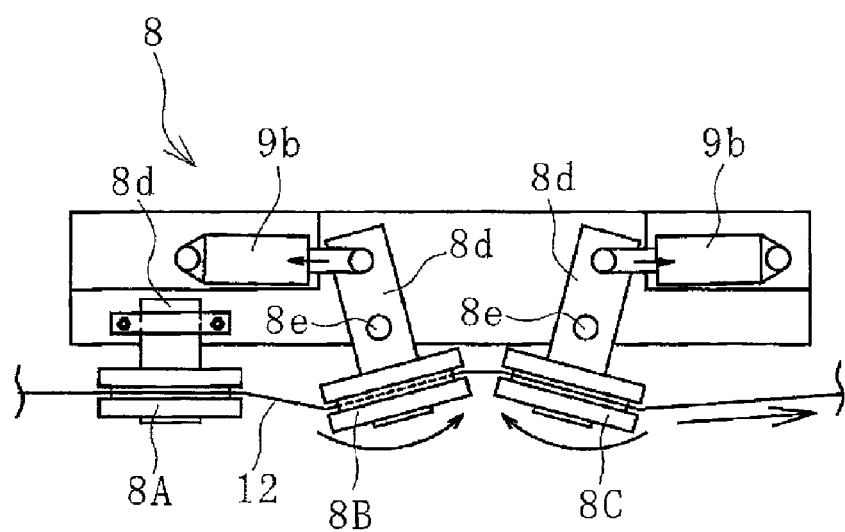
FIG. 9 is an explanatory diagram illustrating a state in which additional tension is imparted to the twisted wire cord by the tension imparting unit of FIG. 8.

As illustrated in FIG. 9, in order to impart additional tension to the moving twisted wire cord 12 using the direction changing mechanism 9b, the orientations of the grooved rotary rollers 8B and 8C are changed, and the direction of the twisted wire cord 12 guided by the respective circumferential grooves is changed. In other words, the orientations of the grooved rotary rollers 8B and 8C are changed to change the direction of the twisted wire cord 12 guided by the respective circumferential grooves. In this embodiment, the orientations of the respective grooved rotary rollers 8B and 8C are changed to opposite directions. Thus, the direction of each of the grooved rotary rollers 8B and 8C guiding the twisted wire cord 12 changes, and additional tension is imparted to the twisted wire cord 12.

When the direction changing mechanism 9b is used, it is possible to impart additional tension to the twisted wire cord 12, while maintaining the positions of the grooved rotary rollers 8A, 8B, and 8C, simply by changing the orientations of the grooved rotary rollers 8A and 8C at the positions thereof. This is advantageous in reducing the space required for the actuation of the tension imparting unit 8.

The number of the grooved rotary rollers 8A, 8B, and 8C is not limited to three and may be two, four, or the like. When imparting tension to the twisted wire cord 12, the number of grooved rotary rollers 8A, 8B, and 8C whose orientations are to be changed can be one or three or more, not limited to two. Each of the grooved rotary rollers 8A, 8B, and 8C not only can be disposed with their respective rotating shaft 8d crossing the twisted wire cord 12, but also can be disposed with their respective rotating shaft 8d being longitudinal to the twisting cord 12.

The invention claimed is:

1. A method of manufacturing a rubber coated twisted wire cord, which continuously manufactures a rubber coated twisted wire cord by winding a twisted wire cord reeled out from an unreeling unit around a winding unit and by coating unvulcanized rubber on an outer circumferential surface of the twisted wire cord that is moving under tension, wherein
    additional tension for the purpose of not causing unraveling is imparted to the twisted wire cord at a position on an upstream side from a position where the unvulcanized rubber coats the twisted wire cord in a moving direction of the twisted wire cord,
    the unvulcanized rubber coats the outer circumferential surface of the twisted wire cord while the additional tension is imparted, and winding the twisted wire cord around the winding unit comprises winding the twisted wire cord coated with the unvulcanized rubber around the winding unit.

2. The method of manufacturing a rubber coated twisted wire cord according to claim 1, wherein an extension length of the twisted wire cord from the position on the upstream side from the position where the unvulcanized rubber coats the twisted wire cord in the moving direction of the twisted wire cord to the position where the unvulcanized rubber coats the twisted wire cord is within 1 m.

3. The method of manufacturing a rubber coated twisted wire cord according to claim 2, wherein the additional tension is imparted to the twisted wire cord by making the outer circumferential surface of twisted wire cord abut an outer circumferential surface of a rotary roller at the position on the upstream side from the position where the unvulcanized rubber coats the twisted wire cord in the moving direction of the twisted wire cord and by moving the rotary roller.

4. The method of manufacturing a rubber coated twisted wire cord according to claim 2, wherein the additional tension is imparted to the twisted wire cord by guiding the twisted wire cord at the position on the upstream side from the position where the unvulcanized rubber coats the twisted wire cord in the moving direction of the twisted wire cord to engage along a circumferential groove of a grooved rotary roller having the circumferential groove on the outer circumferential surface; and by changing an orientation of the grooved rotary roller to change a direction of the twisted wire cord guided by the circumferential groove.

5. The method of manufacturing a rubber coated twisted wire cord according to claim 1, wherein the additional tension is imparted to the twisted wire cord by making the outer circumferential surface of twisted wire cord abut an outer circumferential surface of a rotary roller at the position on the upstream side from the position where the unvulcanized rubber coats the twisted wire cord in the moving direction of the twisted wire cord and by moving the rotary roller.

6. The method of manufacturing a rubber coated twisted wire cord according to claim 1, wherein the additional tension is imparted to the twisted wire cord by guiding the twisted wire cord at the position on the upstream side from the position where the unvulcanized rubber coats the twisted wire cord in the moving direction of the twisted wire cord to engage along a circumferential groove of a grooved rotary roller having the circumferential groove on the outer circumferential surface; and by changing an orientation of the grooved rotary roller to change a direction of the twisted wire cord guided by the circumferential groove.

* * * * *